US006570988B1

(12) United States Patent
Venkatesan et al.

(10) Patent No.: US 6,570,988 B1
(45) Date of Patent: May 27, 2003

(54) SIMPLE TECHNIQUE FOR IMPLEMENTING A CRYPTOGRAPHIC PRIMITIVE USING ELEMENTARY REGISTER OPERATIONS

(75) Inventors: Ramarathnam Venkatesan, Redmond, WA (US); Mariusz Jakubowski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/329,139

(22) Filed: Jun. 9, 1999

(51) Int. Cl.$^7$ ................................................. H04L 9/28
(52) U.S. Cl. ............................. 380/28; 380/29; 380/39; 708/491; 708/492
(58) Field of Search ............................. 380/28, 37, 29; 382/28; 708/491, 492

(56) References Cited

U.S. PATENT DOCUMENTS 5,003,597 A  *  3/1991   Merkle .......................... 380/37
5,724,428 A  *  3/1998   Rivest .......................... 380/37
5,835,600 A  * 11/1998   Rivest .......................... 380/44
6,269,163 B1 *  7/2001   Rivest .......................... 380/28

OTHER PUBLICATIONS

Dusse et. al. A Cryptographic Library for the Motorola DSP56000.*
Denning, Cryptography and Data Security, Addison–Wesley, 1982.*
Morris Mano, Computer System Architecture, Prentice Hall, 1993.*
Bosselaers, et. al. Comparison of three modular reduction reduction functions, CRYPTO 93, 175–186, 1994.*
Dorothy Denning, Addison–Wesley, pp. 63–64, 90–93, 135–139, 149, 1982.*
M. Mano, Computer System Arcitecture , Prentice Hall, 1994.*
Donald E. Knuth, The Art of Computer Programming, Addison–Wesley, 1969.*
Tucker, *The Computer Science and Engineering Handbook*, CRC Press, 1992, pp. 398–403.
Mano, *Computer System Architecture 3e*, Prentice Hall, 1993, pp. 93–118.
Schneier et al, *Applied Cryptography, Second Edition*, John Wiley & Sons, Oct. 1995, pp. 446–447, 455.
Bosselaers et al, "Comparison of Three Modular Reduction Functions", CRYPTO '93, 1994, pp. 175–186.
Denning, *Cryptography and Data Security*, Addison–Wesley Publishing Company, 1982, pp. 59–64, 71–74, 90–93, 135–138, 147.

* cited by examiner

*Primary Examiner*—Gail Hayes
*Assistant Examiner*—James Seal
(74) *Attorney, Agent, or Firm*—Lee & Hayes, PLLC

(57) ABSTRACT

A technique which implements a primitive for computing, e.g., a checksum. Specifically, this primitive replaces a mod(M) operation with a series of simple elementary register operations. These operations include mod $2^n$ multiplications, order manipulations (e.g., byte or word swaps), and additions—all of which are extremely simple to implement and require very few processing cycles to execute. Hence, use of our inventive technique can significantly reduce the processing time to compute various cryptographic parameters, such as, e.g., a message authentication code (MAC), or to implement a stream cipher, over that conventionally required. This technique has both invertible and non-invertible variants.

9 Claims, 5 Drawing Sheets

ALTERNATE COMPUTE SUM PROCEDURE

SIMPLE TECHNIQUE FOR IMPLEMENTING A CRYPTOGRAPHIC PRIMITIVE USING ELEMENTARY REGISTER OPERATIONS

BACKGROUND OF THE DISCLOSURE

1. Field of the Invention

The invention relates to a technique for implementing a primitive for computing, e.g., a checksum. Advantageously, this technique is relatively simple and uses rather elementary register operations, thus saving significant processing time over that conventionally required to compute, e.g., a message authentication code (MAC), or implement a stream cipher.

2. Description of the Prior Art

Many different cryptographic techniques currently in use today employ mathematical functions that include modular arithmetic, typically calculating a residue of a number with respect to a relatively large prime number (M), such as, for example, $2^{31}-1$ or larger. An illustrative such function, f(x), would be of the form $f(x)=ax+b \bmod(M)$ in a Galois field (GF) over $2^n$, where $n=2m+1$, and n and m are predefined integers in a field $Z(\bmod M)$. While the functions themselves greatly vary from one technique to the other, they commonly require computation of a mod(M) operation of one form or another and usually on a highly repetitive basis.

Not only will such modular operations be used for encrypting each and every block of plaintext in a message to yield a corresponding ciphertext block and decrypting the latter to recover the associated plaintext block, but also in computing intermediate portions of the technique, such as a message authentication code (MAC) or a stream cipher.

Performing a single mod(M) operation can require as many as 10–15 processing cycles, if not more (based on the value of a modulus, M). Since a cryptographic technique requires a large number of such operations, a significant amount of processing time, associated with employing that technique, can be consumed in simply calculating mod(M) operations.

Cryptographic techniques are increasingly finding use to protect information in a wide and expanding variety of highly diverse applications, as well as in an expanding array of devices, from highly sophisticated general purpose devices, such as, e.g., personal computers and workstations, to relatively simple dedicated devices, such as, e.g., "smart cards", remote controls and electronic appliances.

For example, in view of the ease and low cost of communicating by electronic mail, the Internet (among other network modalities) is experiencing explosive and exponential growth as a preferred communication medium. However, the Internet, being a publicly accessible network, is not secure and, in fact, has been and increasingly continues to be a target of a wide variety of attacks from various individuals and organizations intent on eavesdropping, intercepting and/or otherwise compromising or even corrupting Internet message traffic or illicitly penetrating Internet sites. This security threat, in view of an increasing reliance placed on use of the Internet as a preferred medium of communication, exacerbates the efforts in the art to develop increasingly strong cryptographic techniques that provide enhanced levels of security to electronic communication, such as mail messages, data and computer files, from third-party eavesdropping, interception and possible tampering. As a consequence, cryptographic processing is being incorporated into an increasing array of personal computer software, particularly web browsers and other operating system components, and electronic mail programs and other application programs, in order to provide secure Internet connectivity.

A totally different cryptographic application involves so-called "smart cards". Here, a dedicated credit-card sized device which employs a rather unsophisticated and inexpensive microprocessor, i.e., a "smart card", stores bank and/or other financial balances for a corresponding individual. The microprocessor, using a program stored internally to the card, can validate a transaction and appropriately change each such balance based on the transaction. Specifically, that individual can invoke an electronic transaction with another party, such as a vendor or a bank, by simply inserting the card into an appropriate data terminal and entering transaction data into a keyboard associated with the terminal in order to debit and/or credit all or a portion of a balance stored on the card. Transacting in this fashion provides an instantaneous monetary transfer while eliminating any need for and costs associated with processing paper currency or paper-based monetary instruments, such as checks. The stored program utilizes extremely strong cryptographic techniques to protect the information stored on the card, particularly the balances, from illicit third party access and tampering.

However, as noted above, cryptography incurs processing overhead. While in sophisticated devices having significant processing capacity, such as PCs and workstations, the overhead reduces overall system throughput, in other devices, with rather limited processing capacity, such as smart cards, remote controls and other "low-end" devices, the overhead may be intolerable to the point of precluding the use of sufficiently strong cryptographic techniques in such devices.

Hence, given the rapid and apparently ever-increasing desire in the art to incorporate cryptographic techniques into a wide variety of devices, particularly those having limited processing power, a need currently exists in the art to reduce the processing time required to implement cryptographic techniques.

In particular, processing overhead associated with certain cryptographic techniques, particularly in computing a checksum, might be sharply reduced if a mod(M) operation could be replaced by an equivalent though less processor-intensive operation(s). If this result could be achieved, then the overall throughput of highly sophisticated devices, such as personal computers and workstations that employ various cryptographic techniques could be advantageously increased. Furthermore, if such overhead could be reduced, then strong cryptographic techniques could be incorporated into a multitude of computer-related devices which heretofore had insufficient processing power to adequately support such techniques.

SUMMARY OF THE INVENTION

Advantageously, our present invention satisfies this need by implementing a primitive for computing a checksum but advantageously without any need for a mod(M) operation.

In accordance with our broad inventive teachings, this primitive replaces the mod(M) operation with a series of simple elementary register operations. These operations include mod $2^n$ multiplications, order manipulations (e.g., byte or word swaps), and additions—all of which are extremely simple to implement and require very few processing cycles to execute. Use of our inventive technique can significantly reduce the processing time over that conventionally required to compute various cryptographic parameters, such as, e.g., a message authentication code (MAC), or to implement a stream cipher.

Specifically, an elemental, illustrative and non-invertible version of our technique relies on computing the primitive through the following sequence of equations:

$$x^S \leftarrow \text{wordswap}(x)$$
$$y \leftarrow Ax + Bx^S \bmod(2^n)$$
$$y^S \leftarrow \text{wordswap}(y)$$
$$z \leftarrow Cy^S + yD \bmod(2^n)$$
$$\theta \leftarrow z + y^S E \bmod(2^n)$$

where:
coefficients A, B, C, D and E are each an odd random integer less than or equal to $2^n$; and
θ is an n-bit string.

For use in generating a MAC or other cryptographic parameter, the coefficients are "secret"; however, when used to generate a checksum, these coefficients are publicly known.

Advantageously, our inventive technique has, as its feature, both invertible and non-invertible variants.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of our present invention can be utilized in any one of a wide range of cryptographic techniques which involve computing a checksum. Such techniques are those which, e.g., compute message authentication codes (MACs), or implement stream ciphers.

To facilitate reader understanding, we will discuss our invention in the context of its use in such a technique, though quite generalized, that could be employed in a client-server transaction processing environment where transaction messages are to be communicated over an insecure communication network, such as the Internet, and specifically in the context of computing a MAC employed in that technique.

A. Overview

Figure 1:
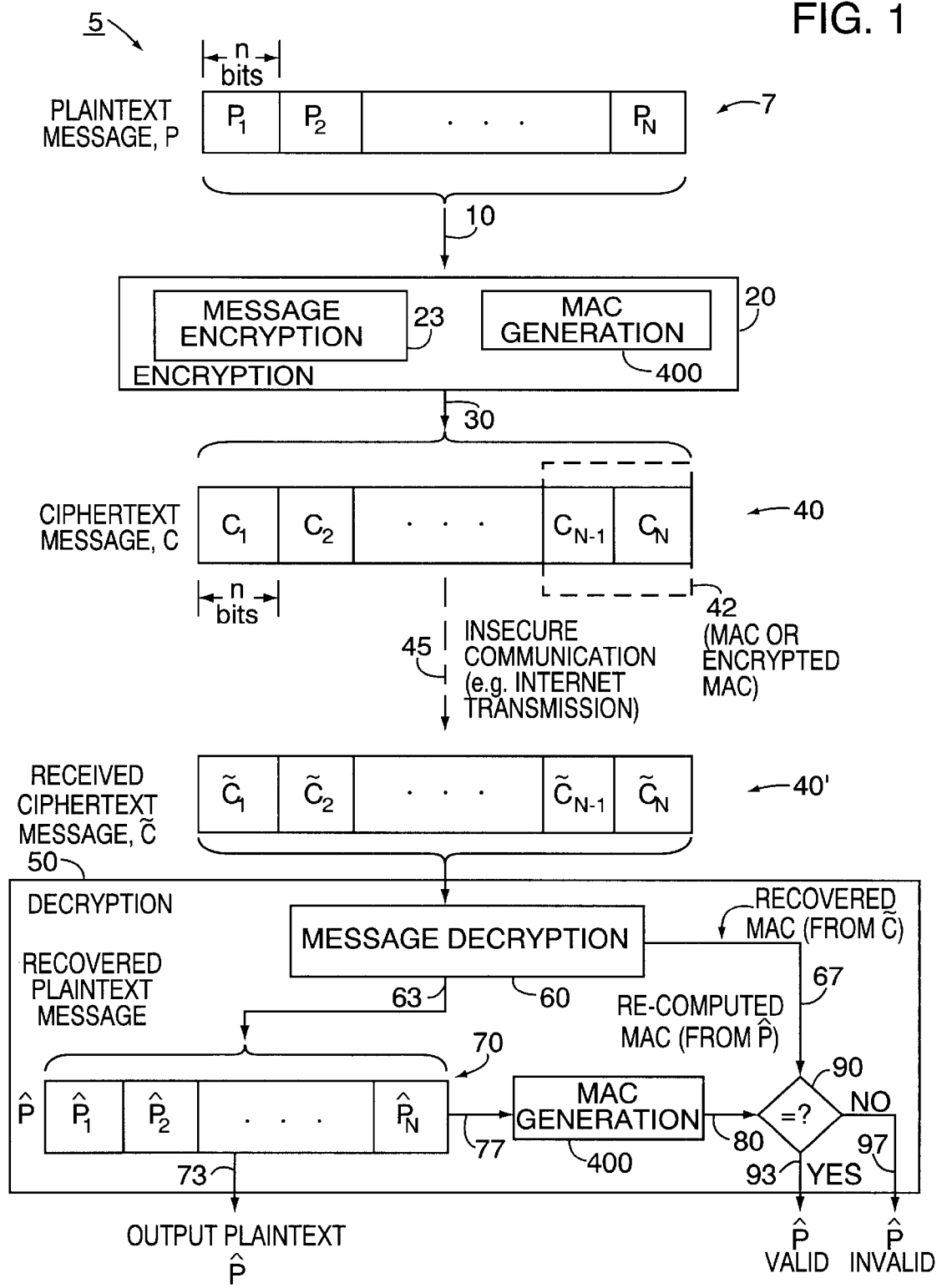
FIG. 1 depicts a block diagram of overall end-to-end cryptographic process 5 that utilizes the present inventive teachings to illustratively generate a message authentication code (MAC)

FIG. 1 depicts a block diagram of overall end-to-end cryptographic process 5 which generates a MAC through use of our present invention.

As shown, incoming plaintext information, is organized into so-called "messages". Each such message 7, designated as P, is organized as N blocks ($P_1$, $P_2$, . . . , $P_N$), with each block being n bits in width, where, here for illustrative purposes, n is 32 bits. Each such plaintext block is applied, as symbolized by line 10, to encryption process 20. This process illustratively includes message encryption process 23 and inventive MAC generation process 400. Process 400 (which will be described in detail below in conjunction with FIGS. 4 and 5), given the plaintext message, P, or a suitable cryptographic manipulation of it, as input, generates, in accordance with our invention, a MAC, typically 64 bits in length, that is unique to this message. Message encryption process 23 encrypts the plaintext message into ciphertext and suitably inserts the 64-bit MAC into the message, illustratively as two highest-order blocks ($C_{N-1}$, $C_N$) (a comma separating successive values in parentheses is used hereinafter as an operator to denote concatenation of those values), to yield ciphertext message, C. The two highest-order blocks collectively form MAC 42. Depending on a specific encryption process employed within process 23, MAC 42 may itself be encrypted, such as through a well-known DES (Data Encryption Standard) encryption or another conventional pseudo-random permutation, or not. The ciphertext message is formed of N successive n-bit blocks of ciphertext.

Resulting ciphertext message C is then stored or transferred, through a given modality, e.g., an insecure communication channel, represented by dashed line 45 and typified by an Internet connection, to a recipient location. Here, a received version of the ciphertext message, denoted as $\tilde{C}$ (also labeled as message 40'), is decrypted by decryption process 50 to yield recovered plaintext message 70 also denoted as plaintext message $\hat{P}$, which, to be valid and thus suitable for downstream use, must be identical in all aspects to original plaintext message P. Decryption process 50 contains message decryption process 60, MAC generation process 400 and identity comparator 90.

To determine whether the recovered plaintext message is valid, e.g., has not been altered, message decryption process 60 not only produces the recovered plaintext but also extracts (and decrypts, if necessary) the MAC from ciphertext message $\tilde{C}$. A resulting recovered MAC is applied, as symbolized by line 67, to one input of comparator 90. The recovered plaintext is also applied, as symbolized by line 77, to MAC generation process 400. Process 400 re-computes the MAC from the recovered plaintext message $\hat{P}$ and applies, as symbolized by line 80, a resulting recomputed MAC, to another input of comparator 90. If both of these MACs then applied to corresponding inputs of comparator 90 identically match, then comparator 90 generates a suitable indication on output 93 to indicate that the recovered plaintext message $\hat{P}$, then appearing on output lead 73, is valid for subsequent use. Otherwise, if the recovered and recomputed MACs do not match, comparator 90 generates a suitable indication on output 97 to indicate that the recovered plaintext message P̂, then appearing on output 73, is invalid and should be ignored. Inasmuch as the specific nature, apart from the generation of a MAC, of the encryption and decryption techniques used in encryption process 23 and message decryption process 60, respectively, are irrelevant to the present invention and any one of a wide variety of such techniques can be successfully used, we shall not discuss these aspects in any further detail. Nevertheless, we describe and claim one such illustrative cryptographic technique in our co-pending United States patent applications (to which the reader is referred) entitled: "Cryptographic Technique That Provides Fast Encryption and Decryption and Assures Integrity of a Ciphertext Message" filed Apr. 20, 1998, Ser. No. 09/062,836; and "Method and Apparatus for Producing A Message Authentication Code" filed Apr. 20, 1998, Ser. No. 09/062,837—both of which are incorporated by reference herein and have been assigned to the common assignee hereof.

B. Illustrative Processing Environment

Figure 2:
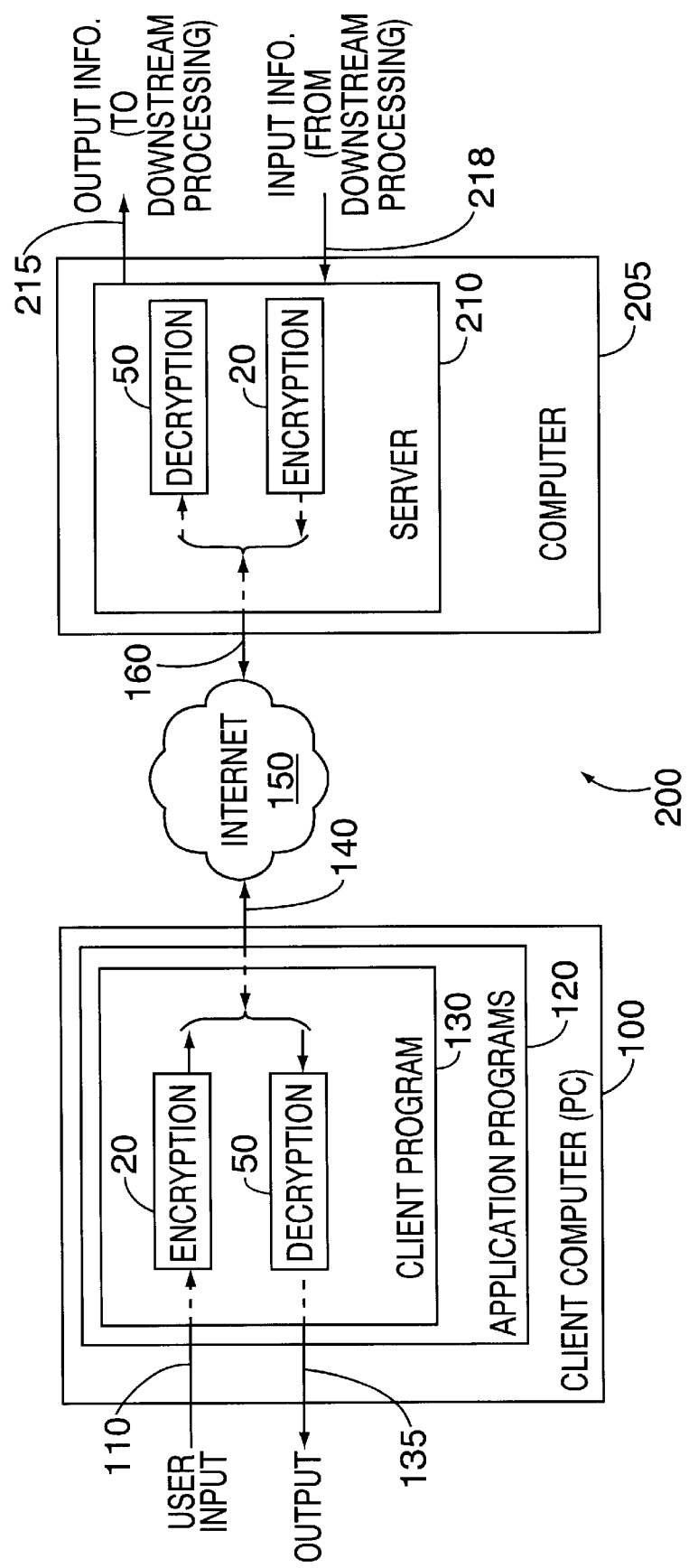
FIG. 2 depicts a high-level block diagram of a typical Internet-based client-server processing environment that illustratively utilizes the present invention.

With the above in mind, consider FIG. 2 which depicts a high-level block diagram of client-server processing environment 200 that utilizes the present invention.

As shown, this environment contains computer 205 which implements server 210, the latter illustratively being a web server. A number of individual remotely-located client computers, each being illustratively a personal computer (PC), of which only one such client, i.e., client computer 100, is specifically shown, is connected using appropriate communications channels, such as channels 140 and 160, through an insecure communications network, here shown as illustratively Internet 150, to computer 205. A user (not specifically shown), stationed at client computer 100 and desirous of obtaining information from the server can invoke corresponding client program 130 at client computer 100. The client program forms one of a number of application programs 120 that collectively reside within and are executed by client computer 100. Though the client program is specifically shown as residing within the application programs, the former can also be implemented as a component, such as a web browser, of an operating system (O/S), for example, of O/S 337 shown in FIG. 3. Server 210, shown in FIG. 2, can implement any of a wide variety of application functions including, for example, a commerce server, a banking server, an electronic mail or a file server. As to electronic commerce, the user might desire to conduct a commercial transaction, through client computer 100 and server 210, that involves providing (as symbolized by line 110) information to the server, such as an account number of the user at a financial institution and payment instructions to transfer funds to a payee, or obtaining information (as symbolized by line 135) from the server, such as available account or credit balances of the user, which, in either event, is confidential to that user. Alternatively, server 210 may be a file server that provides the user with access to various files stored in a repository, any of which the user can download. Once such a file is downloaded, it can be stored within memory 330 (see FIG. 3) situated within client computer 100 for local use thereat. However, any such file may contain proprietary and/or confidential information for which its owner desires to control user access. For example, such a file can be a self-installing executable file of an update for a given program, for which its owner, e.g., a software manufacturer, desires to prevent illicit public access, i.e., preventing the update from being used by any individual who has not remitted appropriate payment for it. Server 210 itself, as shown in FIG. 2, may also provide confidential or proprietary information (as symbolized by line 215) which originates from the user (and was transmitted via network (here Internet) 150 to the server) to downstream equipment (not specifically shown) for subsequent processing, or receive (as symbolized by line 218) confidential or proprietary information from downstream equipment for eventual transmission, via the network, to the user.

Network 150, being illustratively the Internet, is susceptible to being compromised by a third-party. In that regard, the third party could intercept a conventionally enciphered message then being carried over the network and emanating from, e.g., client computer 100, for, e.g., an on-going financial transaction involving a user situated thereat. While the third party may not have sufficient resources either in terms of available processing capacity or time to break a conventional cipher used for encrypting messages and recover the plaintext inherent in the transmitted message, that party may nevertheless possess sufficient knowledge of the ciphertext message, specifically its structural organization, and equipment needed to successfully change that message to the detriment of the user. In that regard, the third party might illicitly tamper with the ciphertext message by substituting one or more predefined ciphertext blocks for corresponding original ciphertext blocks and then transmit a resulting modified ciphertext message back onto the network for carriage to computer 205 for processing thereat.

To safeguard the confidential or proprietary nature of the information transiting over network 150 between client computer 100 and computer 205, from third-party access, both client program 130 and server 210 each utilizes cryptographic communication through incorporation of encryption process 20 and decryption process 50 therein. As such, messages destined for network carriage and generated by one network application peer, either client program 130 or server 210, are each encrypted by encryption process 20 therein to yield corresponding ciphertext messages with embedded MACs, which, in turn, are then each transmitted over network 150 to the other network application peer. Similarly, ciphertext messages received, from the network, by each of the peers is decrypted by decryption process 50 therein to yield an appropriate recovered plaintext message and an indication as to its validity. Encryption and decryption procedures 20 and 50 are inverse procedures of each other.

C. Client Computer 100

Figure 3:
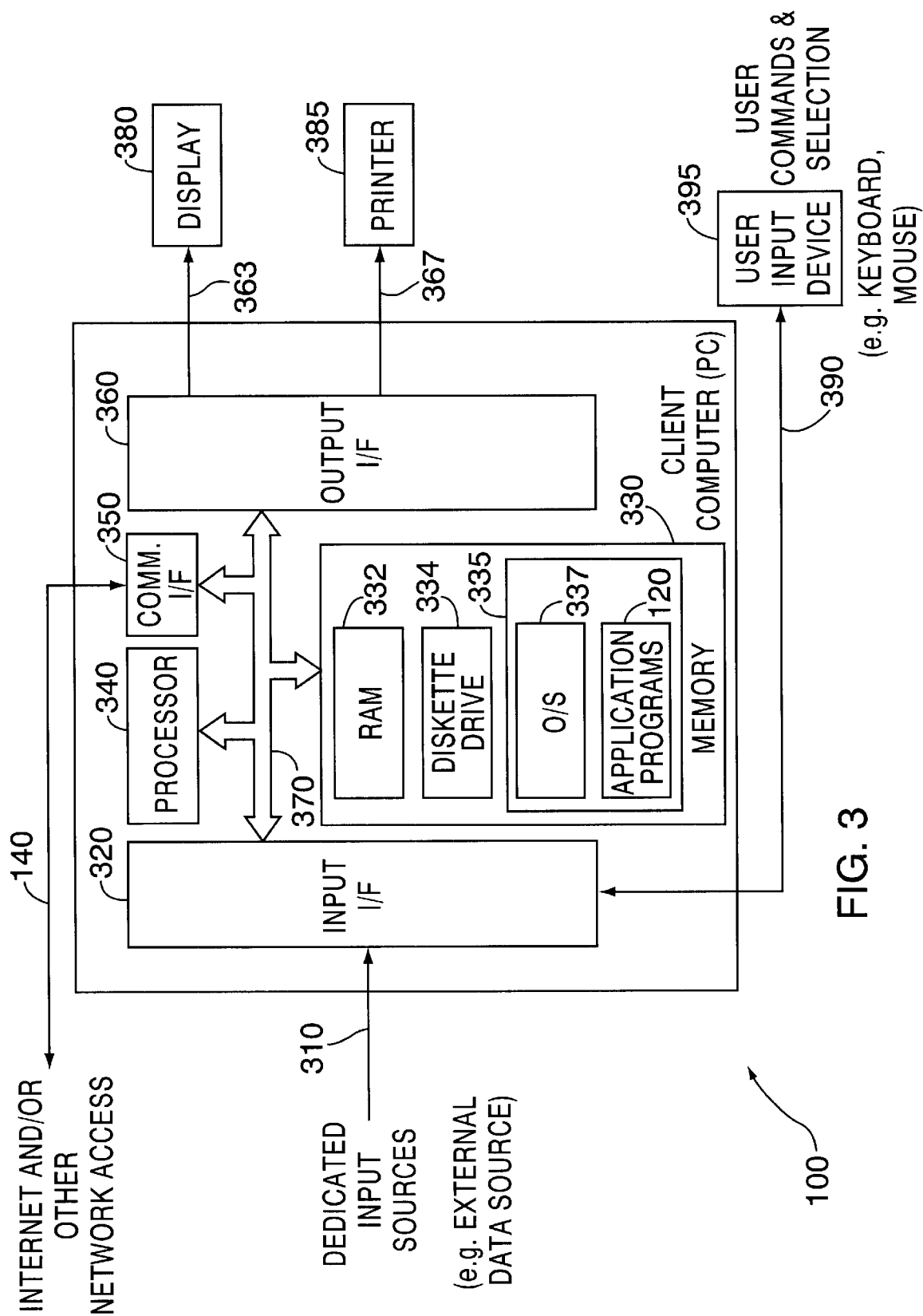
FIG. 3 depicts a block diagram of client computer 100 shown in FIG. 2.

FIG. 3 depicts a block diagram of client computer (PC) 100.

As shown, client computer 100 comprises input interfaces (I/F) 320, processor 340, communications interface 350, memory 330 and output interfaces 360, all conventionally interconnected by bus 370. Memory 330, which generally includes different modalities, including illustratively random access memory (RAM) 332 for temporary data and instruction store, diskette drive(s) 334 for exchanging information, as per user command, with floppy diskettes, and non-volatile mass store 335 that is implemented through a hard disk, typically magnetic in nature. Mass store 335 may also contain a CD-ROM or other optical media reader (not specifically shown) (or writer) to read information from (and write information onto) suitable optical storage media. The mass store stores operating system (O/S) 337 and application programs 120; the latter illustratively containing client program 130 (see FIG. 2) which incorporates our inventive technique. O/S 337, shown in FIG. 3, may be implemented by any conventional operating system, such as the WINDOWS NT operating system ("WINDOWS NT" is a registered trademark of Microsoft Corporation of Redmond, Wash.). Given that, we will not discuss any components of O/S 337 as they are all irrelevant. Suffice it to say, that the client program, being one of application programs 120, executes under control of the O/S.

Advantageously, our present inventive technique, when embedded for use within cryptographic encryption and decryption modules, advantageously saves processing time thereby increasing the throughput of both client computer 100 and server 210 (see FIG. 2).

As shown in FIG. 3, incoming information can arise from two illustrative external sources: network supplied information, e.g., from the Internet and/or other networked facility, through network connection 140 to communications interface 350, or from a dedicated input source, via path(es) 310, to input interfaces 320. Dedicated input can originate from a wide variety of sources, e.g., an external database. In addition, input information, in the form of files or specific content therein, can also be provided by inserting a diskette containing the information into diskette drive 334 from which computer 100, under user instruction, will access and read that information from the diskette. Input interfaces 320 contain appropriate circuitry to provide necessary and corresponding electrical connections required to physically connect and interface each differing dedicated source of input information to computer system 100. Under control of the operating system, application programs 120 exchange commands and data with the external sources, via network connection 140 or path(es) 310, to transmit and receive information typically requested by a user during program execution.

Input interfaces 320 also electrically connect and interface user input device 395, such as a keyboard and mouse, to computer system 100. Display 380, such as a conventional color monitor, and printer 385, such as a conventional laser printer, are connected, via leads 363 and 367, respectively, to output interfaces 360. The output interfaces provide requisite circuitry to electrically connect and interface the display and printer to the computer system. As one can appreciate, our present inventive cryptographic technique can operate with any type of digital information regardless of the modalities through which client computer 100 will obtain, store and/or communicate that information.

Furthermore, since the specific hardware components of computer system 100 as well as all aspects of the software stored within memory 335, apart from the modules that implement the present invention, are conventional and well-known, they will not be discussed in any further detail. Generally speaking, computer 205 has an architecture that is quite similar to that of client computer 100.

D. Limitation Posed by Modulo Arithmetic in Conventional Cryptographic Techniques Conventional cryptographic techniques frequently employ, as a primitive, a checksum that requires computing mod(M), where M is a large prime number, such as, e.g., $2^{31}-1$ or larger.

Unfortunately, a mod(M) operation requires on the order of at least 10–15 machine cycles, if not more (based on the value of modulus M), to compute. This function is repeatedly calculated during both conventional encryption and decryption operations. As such, if such a technique were being implemented on a device with significant processing capacity, such as a PC or workstation, the mod(M) computations would reduce overall throughput, perhaps noticeably. However, this computational overhead may be intolerable in devices that have rather limited processing capacity and hence precludes use of this cryptographic technique in those devices—where its use could be quite beneficial.

E. Our Inventive Technique and its Implementation

Recognizing this deficiency in the art, we have developed a technique for implementing a checksum that advantageously does not require a mod(M) operation.

Our technique implements the checksum as a relatively simple series of elementary register operations. These operations include mod $2^n$ multiplications, order manipulations (being an operation which changes bit ordering in a block, such as, e.g., byte or word swaps) and additions—all of which are extremely simple to implement and require very few processing cycles to execute. The operations used in the primitive can also be pipelined rather effectively. Hence, use of the primitive based on our invention, particularly if pipelined, can significantly reduce the processing time over that conventionally required to compute various cryptographic parameters, such as, e.g., a message authentication code (MAC), or to implement a stream cipher. We believe that our inventive technique can also be advantageously incorporated into certain ciphers to enhance the security of those ciphers against certain plaintext-ciphertext attacks.

We start with the following mathematical definitions: $F(x)=\theta$, and a superscript "S", i.e., as in $x^S$, denotes either an appropriate byte- or word-swap operation.

Figure 6A:
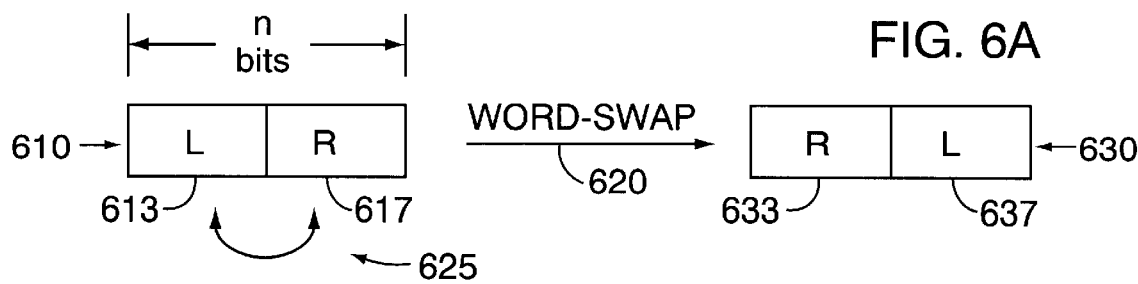
FIG. 6A depicts a typical word-swap operation as can be employed by our present invention.
Figure 6B:
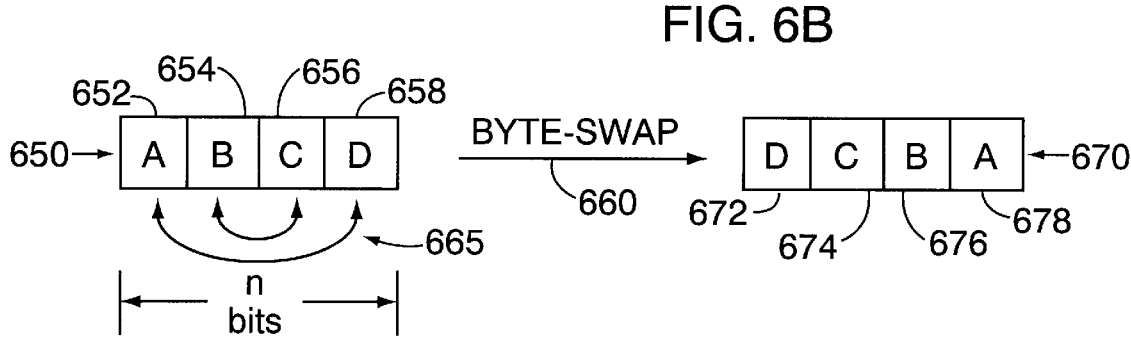
FIG. 6B depicts a typical byte-swap operation as can be employed by our present invention.

To digress slightly, FIGS. 6A and 6B depict word-swap and byte-swap operations, respectively. Given n-bit block 610 (illustratively 32 bits in length) with two 16-bit words (e.g., words 613 and 617 also labeled L and R for "left" and "right", respectively), a word-swap operation, symbolized by line. 620, produces n-bit block 630 with these words switched in position (i.e., with words 633 and 637 that are identical to words 617 and 613, respectively). Such an operation can be implemented in one processing cycle by simply exchanging the individual words as shown by arrow 625. Given n-bit block 650 (also illustratively 32 bits in length) with individual eight-bit bytes 652, 654, 656 and 658 (also labeled as bytes A, B, C, D, respectively), a byte-swap operation symbolized by line 660, produces n-bit block 670 having these four bytes reversed in sequence (i.e., with bytes 672, 674, 676 and 678 being identical to bytes 658, 656, 654 and 652, respectively). The byte-swap operation can be implemented in one processing cycle by exchanging individual bytes in parallel, as shown by arrows 665.

With these definitions in mind, a non-invertible version of the primitive F(x) that implements a checksum, specifically $f(x)=\alpha\chi+b$ mod(M), by computing, in accordance with our inventive teachings, equations (1)–(5) as follows in sequence:

$$x^S \leftarrow \text{wordswap}(x) \quad (1)$$

$$y \leftarrow Ax+Bx^S \bmod(2^n) \quad (2)$$

$$y^S \leftarrow \text{wordswap}(y) \quad (3)$$

$$z \leftarrow Cy^S+yD \bmod(2^n) \quad (4)$$

$$\theta \leftarrow z+y^S E \bmod(2^n) \quad (5)$$

where:
coefficients A, B, C, D and E are each an odd random integer less than or equal to $2^n$; and
θ is an n-bit string.

As can be seen, these equations are implemented using elementary register operations, i.e., order manipulations (e.g., word- or byte-swaps), additions and mod($2^n$) multiplications. Consequently, these operations can be performed using relatively few processing cycles—certainly considerably less than the 10–15 cycles required to perform a mod(M) operation. Though we have shown equations (1) and (3) using word-swap operations, byte-swap operations (or possibly other manipulations that change the bit ordering) could be used instead. For use in generating a MAC or other various cryptographic terms, coefficient values A, B, C, D and E are "secret" values, i.e., not publicly disclosed.

An invertible version of the primitive F(x) that implements f(x), also in accordance with our inventive teachings, through equations (6)–(15) as follows:

$$y \leftarrow Ax \bmod(2^n) \quad (6)$$

$$y^S \leftarrow \text{wordswap}(y) \quad (7)$$

$$z \leftarrow By^S \bmod(2^n) \quad (8)$$

$$z^S \leftarrow \text{wordswap}(z) \quad (9)$$

$$v \leftarrow Cz^S \bmod(2^n) \quad (10)$$

$$v^S \leftarrow \text{wordswap}(v) \quad (11)$$

$$w \leftarrow Dv^S \bmod(2^n) \quad (12)$$

$$w^S \leftarrow \text{wordswap}(w) \quad (13)$$

$$t \leftarrow Ew^S \bmod(2^n) \quad (14)$$

$$\theta \leftarrow t + Ly^S \bmod(2^n) \quad (15)$$

where:
coefficients A, B, C, D and E are each an odd random integer less than or equal to $2^n$; and
L is a random integer less than or equal to $2^n$.

Here, too, when generating a MAC or various other cryptographic terms, the coefficient values A, B, C, D, E and L are all "secret" values. Alternatively, equations (6)–(12) could be used to implement the primitive, with F(x)=w. Moreover, a "reverse" operation (where all the bits in a block are completely reversed in sequence)—which is another type of order manipulation—could be used in lieu of a byte- or word-swap. For example, the primitive F(x) for an invertible form of f(x) could be implemented, in accordance with our invention, through equations (16)–(19) as follows:

$$y \leftarrow Hx \bmod(2^n) \quad (16)$$

$$z \leftarrow \text{reverse}(y) \quad (17)$$

$$s \leftarrow Jz \bmod(2^n) \quad (18)$$

$$\theta \leftarrow s + K \bmod(2) \quad (19)$$

where: coefficients H, J, and K are each a random integer less than or equal to $2^n$.

If this primitive were to be used to generate a MAC or other cryptographic term, then coefficients H, J and K would be "secret" values. Since a reverse operation is relatively slow compared to a byte- or word-swap operation, the use of the primitives given by equations (6)–(12) or (6)–(15) above is preferred over that given by equations (16)–(19).

Clearly, based on the above description, those skilled in the art can readily devise various other primitives, F(x), that provide equivalent cryptographic characteristics for f(x)= ax+b mod(M) and which utilize, in accordance with our invention, mod $2^n$ multiplications, order manipulations and additions—but not a mod(M) operation—and hence can substitute for the specific primitives described above.

As discussed above, a generalized primitive based on our inventive technique can be used to generate a MAC. To do so, a series of primitives $F_1(x), F_2(x), \ldots, F_p(x)$, for function f(x), that are non-invertible and of the same form noted above (as F(x)), are selected but with different values for the corresponding "secret" coefficients, i.e., if $F_1(x)$ has "secret" coefficients A, B, C, D and E, then $F_2(x)$ has "secret" coefficients a, b, c, d and e and so forth. Thereafter, given an input sequence $X=x_1, x_2, \ldots, x_N$ of n-bit strings, corresponding output values (intermediate results) $Y=y_1, y_2, \ldots, y_N$, are computed according to equations (20)–(25) as follows using successive ones of these p primitives (where p<n) for corresponding successive input values $x_i$:

$$y_1 = F_1(x_1) \quad (20)$$

$$y_2 = F_2(x_2 + y_1) \quad (21)$$

$$y_3 = F_3(x_3 + y_2) \quad (22)$$

.
.
.

$$y_p = F_p(x_p + y_{p-1}) \quad (23)$$

$$y_{p+1} = F_1(y_p + x_{p+1}) \quad (24)$$

$$y_{p+2} = F_2(y_{p+1} + x_{p+2}) \quad (25)$$

.
.
.

The MAC can then be formed, in accordance with equation (26) as a function of the intermediate results, as follows:

$$MAC = \left( y_N, \sum_{i=1}^{N} y_i \right) \quad (26)$$

For added security, equation (26) can be modified by introducing a secret or random permutation ($\gamma_i$) for each $y_i$ term in the sum, as shown by equation (27) as follows:

$$MAC = \left( y_N, \sum_{i=1}^{N} \gamma_i y_i \right) \quad (27)$$

where: $\gamma_i$ is selected randomly or as a "secret" predefined value within a range of ±k inclusive, i.e., $\gamma_i \in \{k, k-1, k-2, \ldots, 0, -1, -2, \ldots, -k\}$, where k is a predefined integer. For simplicity, each $\gamma_i$ may be set to the value +1 or −1 with either a random, pseudo-random or "secret" predefined variation among all such $\gamma_i$.

Though equations (20)–(25) utilize a repeating series of the same p primitives, different such series can be used instead. Each series of primitives will produce a separate output hash value y which can then be concatenated together to form a MAC or an individual output, y, of each of the primitives can be summed through use of equation (26) to yield the MAC value. Furthermore, one series could be run, with forward chaining, as indicated by, e.g., equations (20)–(23). A next run of the same series, such as that indicated by, e.g., equations (24) and (25), or a next run of a different series could be run with "backward" chaining. Where backward chaining is used, associated input values could be applied in a reversed order, with respect to those used with forward chaining, to the individual primitives in that series.

Where our inventive technique is used to compute a checksum, the computations are highly similar, if not identical, to those used to compute a MAC but with all the coefficient values, as well as all the $\gamma_i$ values, if used, being publicly known.

With the above in mind, we will now turn to describing the software needed to generate a MAC for use by encryption process 20 and in accordance with a primitive that implements our inventive technique.

Figure 4:
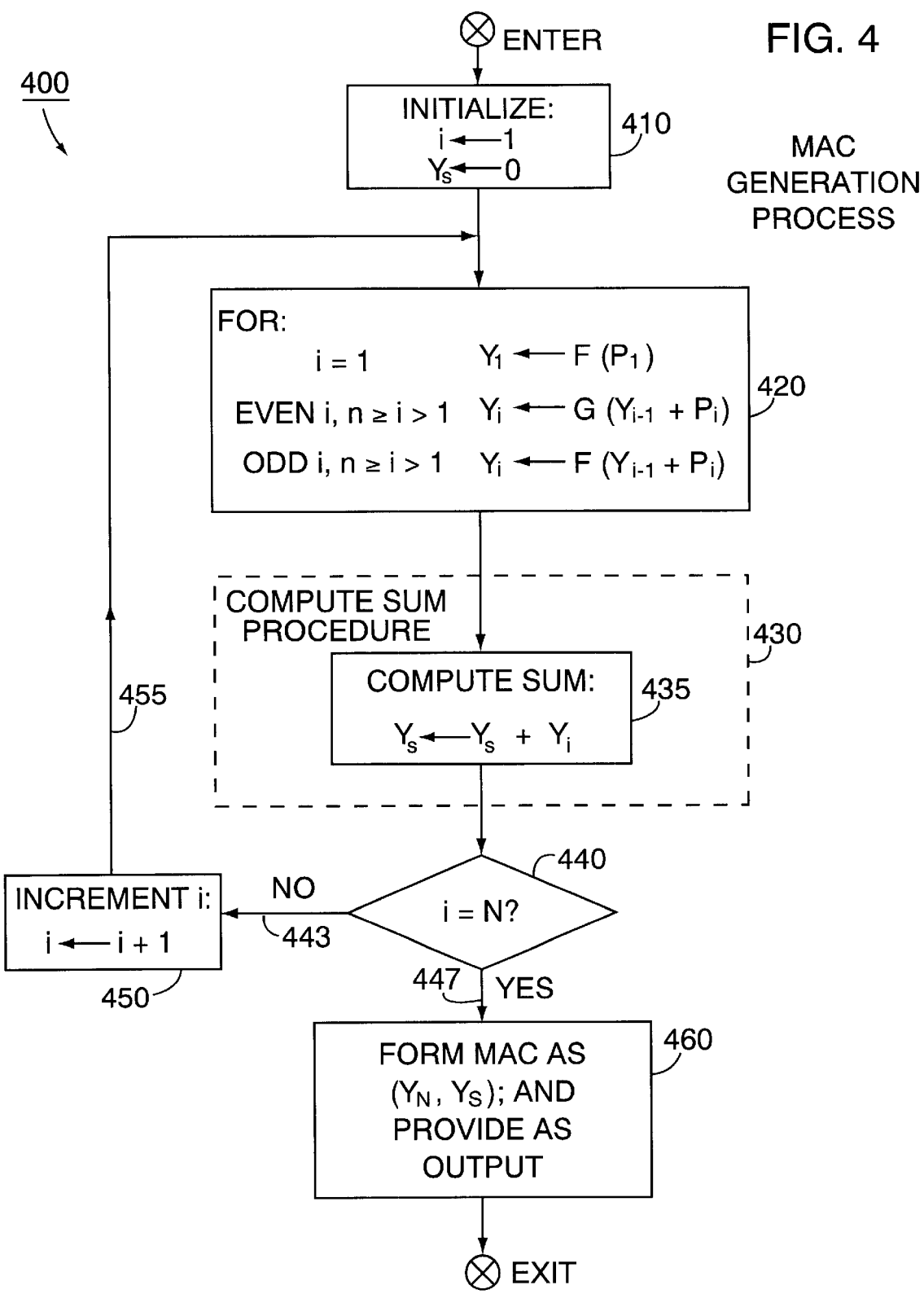
FIG. 4 depicts a high-level flowchart of MAC generation process 400, that is used in process 5 shown in FIG. 1, to produce a MAC in accordance with our present inventive teachings.

FIG. 4 depicts a high-level flowchart of MAC generation process 400 that is used in process 5 shown in FIG. 1 for producing a MAC. This routine implements equations (20)–(25) as discussed above, and assumes that primitives F(x) and G(x) have been completely selected.

In particular, upon entry into routine 410, during execution of either encryption process 20 or decryption process 50, execution first proceeds, as shown in FIG. 4, to block 410. This block initializes a pointer (i) to one and a sum variable ($y_s$) to zero. Thereafter, execution enters a loop formed of blocks 420, 430, 440, and 450 to calculate successive output values, $y_i$, for each input plaintext block ($P_i$) as input, and to accumulate these output values into the sum variable, $y_s$.

Specifically, upon entry into this loop, execution first proceeds to block 420 to calculate output value $y_1$ as equaling $F(P_1)$. Once this occurs, execution proceeds to Compute Sum procedure 430 which through block 435 simply adds the value of output $y_i$ to the sum variable, $y_s$. Once this occurs, execution proceeds to decision block 440 to determine if all N blocks of input plaintext message P have been processed, i.e., whether a current value of pointer i then equals N. In the event any such blocks remain, i.e., the current value of i is less than N, then decision block 440 routes execution, via NO path 443, to block 450. This latter block increments the value of pointer i by one and then directs execution, via feedback path 455, back to block 420 to compute the next successive output value, and so forth. At this point, the computations performed by block 420 will depend on whether, for any given iteration through. block 420, the value of i is then even or odd; hence alternating between primitives F(x) and G(x) for successive i.

Once all the output values have been calculated and summed, decision block 440 routes execution, via YES path 447, to block 460. This latter block simply forms the MAC by concatenating the value of $y_N$ with a current value of the sum variable and supplying, as output, a resulting 64-bit value as the MAC. Once this occurs, execution exits from routine 400.

Figure 5:
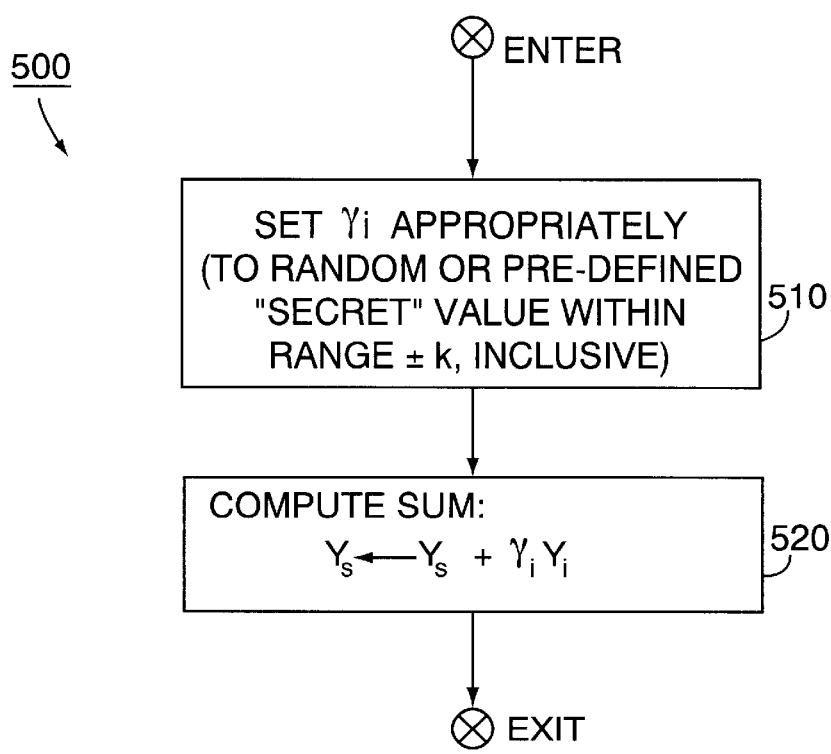
FIG. 5 depicts a high-level flowchart of Alternative Compute Sum procedure 500 that may be used in lieu of Compute Sum procedure 430 that forms a portion of MAC generation process 400 shown in FIG. 4.

FIG. 5 depicts a high-level flowchart of Alternative Compute Sum procedure 500 that may be used in lieu of Compute Sum procedure 430 that forms a portion of MAC generation process 400. Procedure 500 implements equation (26) above.

In particular, upon entry into procedure 500, execution first proceeds to block 510 which sets a value of $\gamma_i$ appropriately. As noted above, this value may be random, pseudo-random or pre-defined within a range of ±k (though values of ±1 are typically used). Once this value has been set, execution proceeds to block 520 which multiplies the current output value $y_i$ by the corresponding value of $\gamma_i$ and adds a resulting value into the sum variable, $y_s$. Once this occurs, execution then exits from procedure 500.

Clearly, those skilled in the art will realize that though the MAC (or checksum) has been described as being 64 bits in length, i.e., two 32-bit blocks, MACs (and checksums) of other bit (and block) sizes, such as a single 32-bit block or more than 64 bits long (but sized in integer blocks) may be used instead. Larger MACs provide greater levels of security, to the extent it is warranted, though at a likely cost of increased processing time to produce the MAC, and, where required, to encrypt and decrypt it.

Although a detailed embodiment, with a number of variations, which incorporates the teachings of the present invention has been shown and described in detail herein, those skilled in the art can readily devise many other embodiments and applications of the present invention that still utilize these teachings.

We claim:

1. A cryptographic process, for use in a device, for encrypting or decrypting a block of input digital plaintext or ciphertext, respectively, into a block of output digital ciphertext or plaintext, respectively, comprising:

converting the input digital plaintext or ciphertext block into the output digital ciphertext or plaintext block, respectively, through a predetermined procedure that comprises, as a primitive, F(x), a predefined sequence of byte-swap, word-swap, reverse, additions, and mod ($2^n$) multiplication operations (where n is a predefined integer), comprising the following equations, which collectively implement the primitive, whereby the primitive, by not determining a value for mod(M), where M is a large prime number, exhibits reduced processing time:

$$x^S \leftarrow \text{wordswap}(x)$$

$$y \leftarrow Ax + Bx^S \mod(2^n)$$

$$y^S \leftarrow \text{wordswap}(y)$$

$$z \leftarrow Cy^S + yD \mod(2^n)$$

$$\theta \leftarrow z + y^S E \mod(2^n)$$

where:

coefficients A, B, C, D and E are each an odd random integer less than or equal to $2^n$; and θ is an output string.

2. The process in claim 1 wherein the digital blocks of plaintext and ciphertext are both n-bits in length.

3. A computer readable medium having computer executable instructions stored therein for performing the steps of claim 1.

4. A computer readable medium having computer executable instructions stored therein for performing the steps of claim 1.

5. A cryptographic process as recited in claim 1 wherein M is a prime number greater than or equal to $2^{31}-1$.

6. A cryptographic process, for use in a device, for encrypting or decrypting a block of input digital plaintext or ciphertext, respectively, into a block of output digital ciphertext or plaintext, respectively, comprising:

converting the input digital plaintext or ciphertext block into the output digital ciphertext or plaintext block, respectively, through a predetermined procedure that comprises, as a primitive, F(x), a predefined sequence of byte-swap, word-swap, reverse, additions, and mod ($2^n$) multiplication operations (where n is a predefined integer), comprising the following equations, which collectively implement the primitive, whereby the primitive, by not determining a value for mod(M), where M is a large prime number, exhibits reduced processing time:

$$y \leftarrow Ax \mod(2^n)$$

$$y^S \leftarrow \text{wordswap}(y)$$

$$z \leftarrow By^S \mod(2^n)$$

$z^S \leftarrow \text{wordswap}(z)$ $v \leftarrow Cz^S \mod(2^n)$ $v^S \leftarrow \text{wordswap}(v)$ $w \leftarrow Dv^S \mod(2^n)$ $w^S \leftarrow \text{wordswap}(w)$ $t \leftarrow Ew^S \mod(2^n)$ $\theta \leftarrow t + Ly^S \mod(2^n)$ where:

coefficients A, B, C, D and E are each an odd random integer less than or equal to $2^n$;

L is a random integer less than or equal to $2^n$; and $\theta$ is an output string.

7. The process in claim 6 wherein the digital blocks of plaintext and ciphertext are both n-bits in length.

8. A computer readable medium having computer executable instructions stored therein for performing the steps of claim 6.

9. A cryptographic process as recited in claim 6 wherein M is a prime number greater than or equal to $2^{31}-1$.

* * * * *